3,239,460
FINAL PURIFICATION OF SEA WATER DESALTED BY CALCIUM HYDROXIDE ION EXCHANGE
Karel Popper, Modesto, Calif. (166 Hazel Drive, Pleasant Hill, Calif.), and Vladimir Slamecka, Chevy Chase, Md. (1661 Doncaster Drive NE., Atlanta, Ga.)
No Drawing. Filed Feb. 19, 1963, Ser. No. 259,738
3 Claims. (Cl. 210—24)

This invention generally relates to ion exchange processes and is particularly concerned with a procedure for removing calcium from calcium-containing solutions.

While the invention is applicable to the removal of calcium from calcium-containing solutions, in general, the invention will be explained in connection with the removal of calcium from desalted, calcium-containing sea water.

In the desalting of sea water by ion exchange, the polar impurities contained in the seat water such as, for example, sodium chloride, are customarily removed by passing the sea water through a bed of cation exchange and anion exchange resins. The cation exchanger is in the calcium form while the anion exchanger is in the OH form. When the sea water is passed through the ion exchange bed, the polar impurities in the sea water are thus exchanged for calcium and OH, respectively. Calcium hydroxide is only sparingly soluble in water so that a major amount of the calcium hydroxide thus formed precipitates in the form of a solid. As, however, calcium hydroxide is soluble in water to a certain extent, the effluent, that is the desalted sea water, is saturated or at least almost saturated with calcium hydroxide. In practice, the effluent may contain up to 0.17% of calcium hydroxide. The presence of the calcium hydroxide in the desalted water makes the water alkaline and unfit to drink.

With a view to removing the calcium hydroxide from the otherwise desalted sea water, it has previously been suggested to convert the calcium hydroxide into calcium carbonate by contacting the solution with, for example, carbon dioxide. The calcium carbonate precipitate thus formed is then mechanically removed from the solution, for example by centrifuging or filtering. It will be realized that the formation and removal of the calcium carbonate is connected with considerable expenditure and expense and moreover entails loss of a portion of the regenerant material.

According to a different proposal, the calcium hydroxide dissolved in the effluent is again exchanged for sodium chloride by passing the effluent through a column of a cation and anion exchanger in the sodium and chloride form, respectively. In this manner, water containing about 0.25% of sodium chloride is obtained. Water obtained in this manner, however, has a slightly salty taste and is not suitable for many of the end uses to which water customarily is put.

Accordingly, it is a primary object of this invention to overcome the disadvantages of the prior art procedures for removing calcium hydroxide from desalted water and to provide a procedure wherein the calcium can be removed in a simple, efficient and inexpensive manner.

Another object of this invention is to provide for a method for removing calcium from otherwise desalted sea water with a minimum of losses in reactants and raw materials.

Generally, it is an object of this invention to improve on ion exchange processes used in the desalting of water as presently practiced.

Briefly, and in accordance with this invention, desalted sea water which is saturated or almost saturated with calcium hydroxide is passed through a cation exchanger in the magnesium form whereby the calcium in the water is exchanged for magnesium. As the solubility of magnesium hydroxide in water is considerably less than that of calcium hydroxide, the major portion of the magnesium hydroxide formed precipitates and can be recovered as an article of commerce.

The invention also provides for a particularly advantageous procedure for bringing a cation exchange material into the magnesium form which thereafter is employed for removing the calcium from the calcium containing water. According to this aspect of the invention, sea water is pumped for an extended period of time through an ion exchange column of predetermined length. The ion exchange column contains a sulfonic polystyrene cation exchanger of relatively low divinyl benzene cross linkage. It was ascertained that if the sea water is pumped through such column, a given segment or portion of the column is brought almost exclusively into the magnesium form. This means that almost all the valences corresponding to the active groups, that is, the active sites, are satisfied or occupied by magnesium ions. The reason for this is that about 10% of the cationic polar contaminants of ordinary sea water consist of magnesium. As is known, magnesium is held much more strongly by exchange resins than sodium. In fact, the bonding strength ratio between magnesium and sodium at a cation exchange resin is about 1.85:1. For this reason, the magnesium ions in the sea water are more strongly attracted by the exchange resin and the active sites of the resin are first occupied by magnesium and only after substantially the entire amount of magnesium has been removed from the water does the exchange of sodium in the water take place. Due to the reasons advanced, distinguishable portions are formed in the column and the portion of the cation exchanger in the magnesium form can be removed and placed in a different column in which the ion exchange of the calcium containing water thereafter takes place.

Calcium, in turn, is held by the resin about 1.42 times more strongly than magnesium and the exchange of the calcium for magnesium, therefore, does not present any problems.

It will be realized, of course, that the removal of the calcium from the water can be effected in any type of cation exchange material in the magnesium form and the invention is not limited to the preferred procedure as described hereinabove.

As previously mentioned, the solubility of magnesium hydroxide in water is extremely low so that, in fact, magnesium hydroxide can be considered as a virtually insoluble compound. A saturated aqueous solution of magnesium hydroxide, therefore, does not reveal the presence of magnesium either by taste or other characteristics and the minute amounts of magnesium chloride in the solution do not exhibit any appreciable physiological activity. Thus, while the solubility of sodium hydroxide is very high and that of calcium hydroxide is sufficiently high so as to make a saturated aqueous solution thereof unfit to drink, the extremely low solubility of magnesium hydroxide does not affect the organoleptic qualities of the water.

Due to the low solubility of the magnesium hydroxide, the major amount of the magnesium hydroxide formed during the exchange procedure is, of course, obtained in the form of a solid. By using a suitably constructed column, the solid magnesium hydroxide is retained within the confines of the column and may be removed therefrom for recovery and further use. Therefore, and in accordance with a further aspect of this invention, the exchange column, after the exchange of the calcium for magnesium has taken place, may be backwashed so as to flush out magnesium hydroxide and thereafter to collect the magnesium hydroxide in the effluent in any suitable manner. Thus, the magnesium hydroxide may be allowed to settle or may be separated by centrifuging or filtering.

The invention will now be described by several examples it being understood, however, that these examples are given by way of illustration and not by way of limitation and that many changes may be effected without affecting in any way the scope and spirit of this invention as recited in the appended claims.

*Example I*

This experiment was carried out in a column which was 3 feet tall and had an inside diameter of 1 inch. The column was filled with a cation exchanger known in commerce under the trade name of "Duolite C-20." The resin was brought in the magnesium form by passing a solution of magnesium chloride through the column. The column was then washed with distilled water to remove chloride. The washing with the distilled water was continued until no precipitate was formed upon addition of acidified silver nitrate.

Previously desalted sea water having a calcium hydroxide content of 0.16% was then passed down-flow through the column at a flow rate of 12 resin volumes per hour. 2 liters of the effluent were collected and analyzed. The calcium content in the effluent was less than 1 part per million as determined by flame analysis. The pH of the desalted sea water prior to the exchange was 12.2 while the pH of the effluent was 5.6.

The water has an excellent taste and could not be distinguished from good grade tap water.

*Example II*

10 liters of a 0.15% solution of calcium hydroxide in water were passed through the same column as employed in Example I. The column was in the magnesium form, that is, all the active sites of the cation exchanger were taken up by magnesium ions. The effluent was analyzed. The analysis showed that the effluent was free of calcium and fit to drink.

A visible precipitate of magnesium hydroxide formed in the column. The column was then backwashed, that is, water was passed through the column up-flow at a fast rate. The precipitate was filtered off, dried and analyzed. The analysis showed that it consisted essentially of magnesium hydroxide with minor amounts of magnesium carbonate.

*Example III*

This experiment was carried out in a column which was 5 feet tall and had an inside diameter of 1 inch. The column was filled with a sulfonic polystyrene cation exchanger which was cross linked with divinyl benzene and was in the sodium form. Sea water was pumped through the column for 30 minutes. The cation exchanger in the first foot of the column was substantially exclusively in the magnesium form while the remaining four feet were in the sodium form. The first foot of the exchange resin was then removed to a different column. Previously desalted sea water containing 0.16% of calcium hydroxide was then passed through the column containing the cation exchanger in the magnesium form. The effluent was found to be free from calcium. A precipitate of magnesium hydroxide was formed in the column which was removed by flushing the column with water. The magnesium hydroxide was recovered by filtering.

*Example IV*

A column, 19 mm. in diameter and 380 mm. high, was filled with a mixture consisting of 50 milliliters of sulfonic type cation exchange resin (known in the trade as "Duolite C-20") and 50 milliliters of polystyrene quaternary ammonium anion exchange resin (known in the trade as "Amberlite 410"). The resin bed was charged by up-flow passage of 3% slurry of calcium hydroxide in water.

Sea water collected at the Berkeley Shore of San Francisco Bay and reading 8,500 p.p.m. Na was passed up-flow through the mixed bed at 8:1 flow rate. The first 200 milliliters of the effluent were filtered and analyzed for sodium content which was found to be 2200 p.p.m. Subsequently, the same effluent was passed up-flow through an identical column of mixed resins freshly charged with calcium hydroxide, then filtered and again analyzed for sodium content which read 550 parts p.p.m. Na. The calcium content of the effluent was 0.16%. The effluent was then passed through a cation exchange column in the magnesium form in the same manner as described in connection with Example I.

While specific embodiments of the invention have been shown and described in detail to illustrate the application of the principles of the invention, it will be understood that the invention may be embodied otherwise without departing from such principles.

What is claimed is:
1. A method of desalting sea water, which comprises:
    (a) preparing a cation exchange column in the magnesium form by passing magnesium-containing sea water through an ion exchange column of a sulfonic polystyrene cation exchange material cross linked with divinyl benzene, thereby to satisfy the active sites of a portion of said material with magnesium, and separating said satisfied portion of the column,
    (b) passing sea water through a bed of cation exchange material in the calcium form and anion exchange material in the OH⁻ form, thereby to exchange polar impurities in the sea water for calcium hydroxide and to obtain an effluent substantially saturated with calcium hydroxide and
    (c) passing said effluent through said magnesium saturated portion of the cation exchange material of (a) to exchange the calcium in said effluent for magnesium and thus to obtain an effluent saturated with magnesium hydroxide.
2. A method as claimed in claim 1, wherein precipitated magnesium hydroxide in said portion of the cation exchange material is removed by washing after said exchange of calcium for magnesium in said effluent.
3. In a process of desalting sea water which comprises the steps of passing desalted sea water which is substantially saturated with calcium hydroxide through a cation exchange column in the magnesium form to exchange the calcium for magnesium, thereby to obtain
    (a) an effluent saturated with magnesium hydroxide and
    (b) solid magnesium hydroxide dispersed in the column, the steps of backwashing said column to remove said solid magnesium hydroxide precipitate therefrom and recovering said solid magnesium hydroxide.

References Cited by the Examiner

UNITED STATES PATENTS

| | | | |
|---|---|---|---|
| 2,470,500 | 5/1949 | Lawrence | 210—37 |
| 2,522,856 | 9/1950 | Buswell | 210—23 |
| 3,167,505 | 1/1965 | Salutsky et al. | 210—38 X |

MORRIS O. WOLK, *Primary Examiner.*

JOSEPH SCOVRONEK, *Examiner.*

E. G. WHITBY, *Assistant Examiner.*